US011206252B2

(12) United States Patent
Sugimura

(10) Patent No.: US 11,206,252 B2
(45) Date of Patent: Dec. 21, 2021

(54) INFORMATION PROCESSING SYSTEM, AUTHENTICATION PLATFORM, AND AUTHORIZATION INFORMATION VERIFICATION METHOD

(71) Applicant: Kazunori Sugimura, Kanagawa (JP)

(72) Inventor: Kazunori Sugimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 16/726,473

(22) Filed: Dec. 24, 2019

(65) Prior Publication Data

US 2020/0244643 A1  Jul. 30, 2020

(30) Foreign Application Priority Data

Jan. 24, 2019  (JP) .............................. JP2019-010625

(51) Int. Cl.
  *G06F 7/04* (2006.01)
  *G06F 15/16* (2006.01)
  *G06F 17/30* (2006.01)
  *H04L 29/06* (2006.01)
(52) U.S. Cl.
  CPC ...... *H04L 63/0807* (2013.01); *H04L 63/0869* (2013.01); *H04L 63/0884* (2013.01)
(58) Field of Classification Search
  CPC ............. H04L 63/0807; H04L 63/0884; H04L 63/0869; H04L 63/102
  See application file for complete search history.

(56) References Cited

U.S. PATENT DOCUMENTS

| | | | |
|---|---|---|---|
| 2014/0122349 A1 | 5/2014 | Takatsu et al. | |
| 2014/0123240 A1 | 5/2014 | Seo et al. | |
| 2014/0223320 A1 | 8/2014 | Sugimura et al. | |
| 2015/0350344 A1 | 12/2015 | Sugimura et al. | |
| 2016/0259933 A1 | 9/2016 | Sugimura et al. | |
| 2017/0083697 A1 | 3/2017 | Hayashi et al. | |
| 2018/0121646 A1* | 5/2018 | Sakanashi | H04L 63/102 |
| 2018/0278603 A1* | 9/2018 | Yabe | H04W 12/084 |
| 2019/0103968 A1* | 4/2019 | Srinivasan | G06F 21/41 |

FOREIGN PATENT DOCUMENTS

| | | |
|---|---|---|
| JP | 2014-092823 | 5/2014 |
| JP | 2017-220113 | 12/2017 |

* cited by examiner

*Primary Examiner* — Amie C. Lin
(74) *Attorney, Agent, or Firm* — IPUSA, PLLC

(57) ABSTRACT

An information processing system, an authentication platform, and an authorization information verification method. The information processing system stores, for each service, association information indicating association between service identification information for identifying the service and the one or more usage functions provided as the service and in verifying the authorization information designating service identification information and one or more usage functions, verify validity of the association between the designated service identification information and the one or more usage functions based on the stored association information.

8 Claims, 13 Drawing Sheets

| FIG. 4A |
|---|
| FIG. 4B |

FIG. 5

SERVICE INFORMATION

| SERVICE ID | SERVICE NAME | SCOPE | FUNCTION NAME |
|---|---|---|---|
| xxxxxx | XX SERVICE | A<br>B<br>C | FUNCTION A<br>FUNCTION B<br>FUNCTION C |
| yyyyyy | YY SERVICE | Z<br>Y<br>X | FUNCTION Z<br>FUNCTION Y<br>FUNCTION X |

FIG. 6

ACCESS TOKEN INFORMATION

| ID | ACCESS TOKEN | USER ID | SCOPE | SERVICE ID |
|---|---|---|---|---|
| 1 | Token1 | User0001 | A, B | xxxxxx |
| 2 | Token2 | User0002 | Y, X | yyyyyy |

FIG. 12

DEFINITION OF RELATION BETWEEN SERVICES

| RELATION1 | SERVICE A | SERVICE C |
|---|---|---|
| RELATION 2 | SERVICE A | SERVICE D |

INFORMATION PROCESSING SYSTEM, AUTHENTICATION PLATFORM, AND AUTHORIZATION INFORMATION VERIFICATION METHOD

CROSS-REFERENCE TO RELATED APPLICATIONS

This patent application is based on and claims priority pursuant to 35 U.S.C. § 119(a) to Japanese Patent Application No. 2019-010625, filed on Jan. 24, 2019 in the Japan Patent Office, the entire disclosure of which is hereby incorporated by reference herein.

BACKGROUND

Technical Field

The present disclosure relates to an information processing system, an authentication platform, and an authorization information verification method.

Background Art

In recent years, so-called cloud services are made available on the internet. For example, services are provided in the form of an application programming interface (API). That is, applications and other cloud services can use functions provided by the service through the API.

The API uses, for example, a standard protocol called "OAuth 2.0" for authorization that requires interaction or coordination between resources. For example, Auth 2.0 allows service B to access an API that acquires user data managed by service A within a range approved by the user. At this time, the service A obtains the user's authorization for access to the API by the service B after checking the range accessed by the service B.

The accessed range is called a scope in OAuth 2.0, and the allowable access to data is determined by the scope. The service B receives an access token that proves that the user has been authorized, and subsequent access to the API of the service A can be made using the access token.

SUMMARY

Embodiments of the present disclosure provide an information processing system, an authentication platform, and an authorization information verification method. The information processing system stores, for each service, association information indicating association between service identification information for identifying the service and the one or more usage functions provided as the service and in verifying the authorization information designating service identification information and one or more usage functions, verify validity of the association between the designated service identification information and the one or more usage functions based on the stored association information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is an illustration of a configuration of service information;

FIG. 6 is an illustration of a configuration of access token information;

FIG. 12 is a configuration diagram of an example of relation definition information for defining a relation between services.

Figure 1:
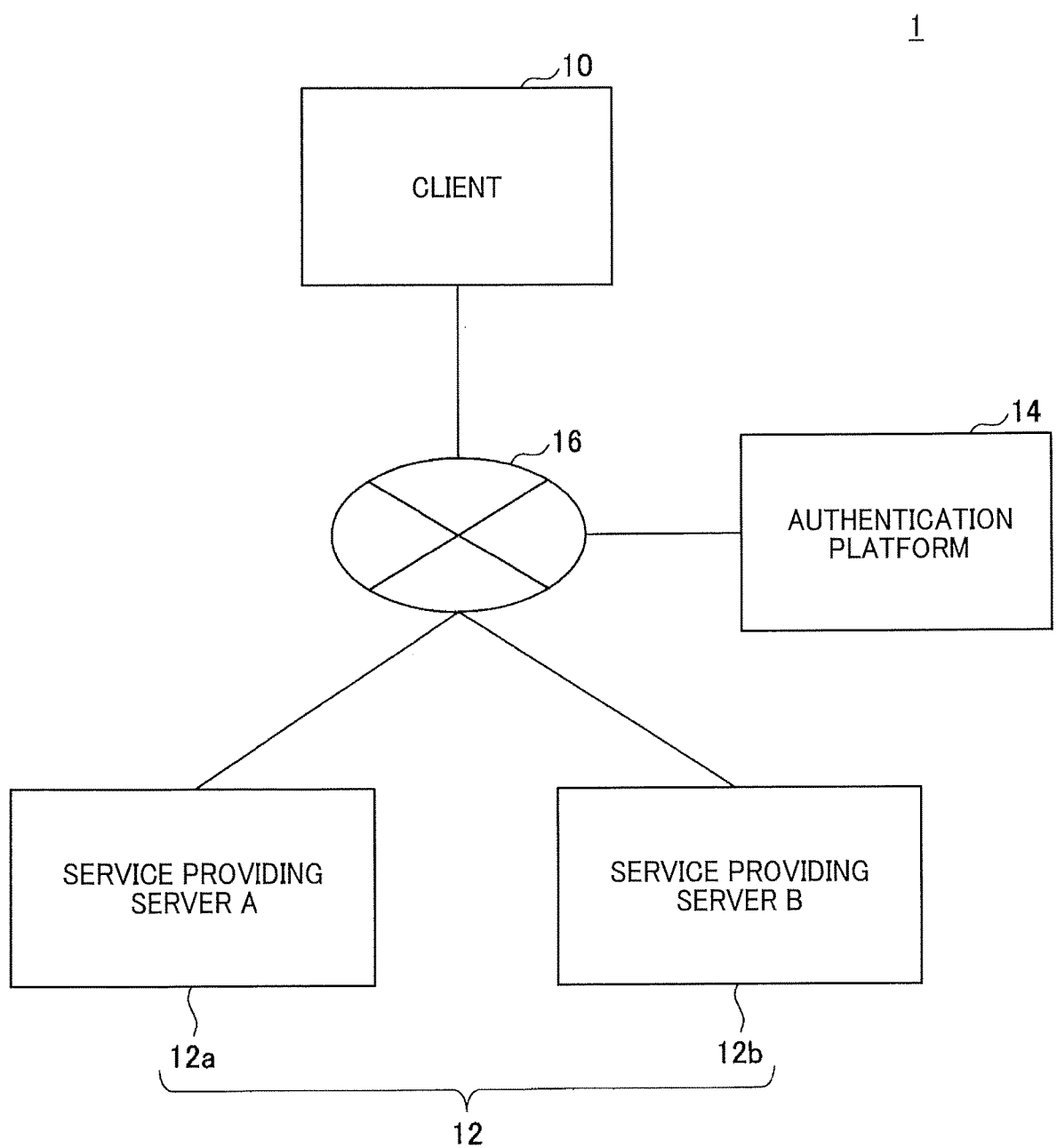
FIG. 1 is a diagram illustrating an example of a system configuration of the information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, a description is given of several embodiments of the present disclosure with reference to drawings.

A system configuration of an information processing system 1 according to the present embodiment is described with reference to FIG. 1. FIG. 1 is a diagram illustrating an example of a system configuration of the information processing system 1 according to embodiments of the present disclosure.

The information processing system 1 illustrated in FIG. 1 includes a client 10, service providing servers 12a and 12b, and an authentication platform 14 communicably connected through a wide area network 16 such as the internet. In the following description, the service providing servers 12a and 12b are collectively referred to as the service providing server 12.

The service providing server 12 is implemented by one or more information processing apparatuses and provides an application programming interface (API) as a service to the client 10 through the network 16. The client 10 is implemented by a device or an information processing terminal operated by a user, and uses a function provided by the service providing server 12 through an API.

The client 10 includes, for example, an MFP, a projector (PJ), an interactive white board (a whiteboard having an electronic whiteboard function capable of mutual communication (IWB)), an output device such as a digital signage, a head up display (HUD) device, an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

The authentication platform 14 is implemented by one or more information processing apparatuses and performs an access token management process and a service information management process. The access token management process generates an access token that proves that the user has been authorized, manages access token information of the generated access token, and verifies the access token. The service information management process manages association between service provided by the service providing server 12 and function provided by the service as service information. The configuration of the information processing system 1 illustrated in FIG. 1 is an example.

Figure 2:
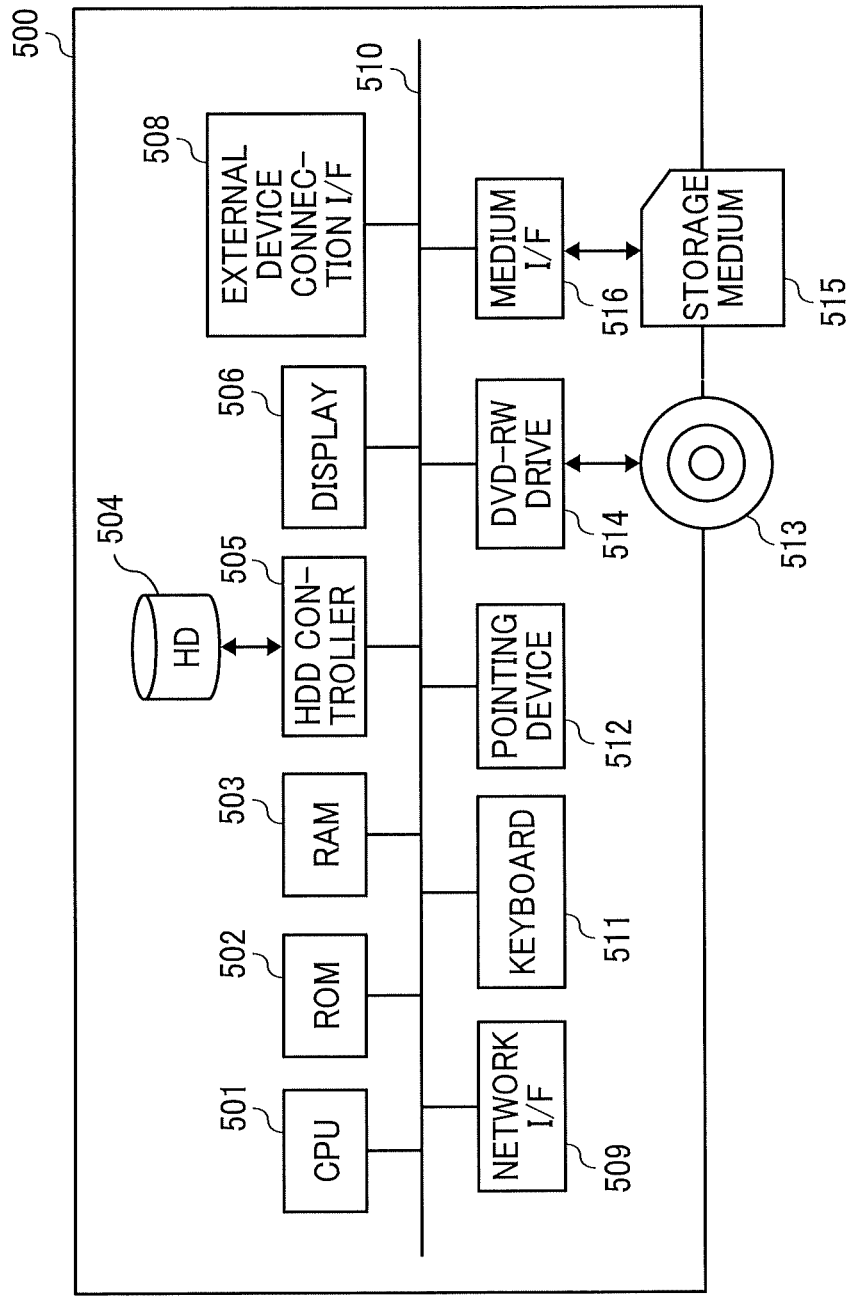
FIG. 2 is a block diagram illustrating an example of hardware configuration of a computer, according to embodiments of the present disclosure.

The service providing server 12 and the authentication platform 14 are implemented by, for example, a computer 500 having a hardware configuration illustrated in FIG. 2. Further, when the client 10 is a PC which is an example of the information processing terminal, the PC is also implemented by a computer 500 having a hardware configuration illustrated in FIG. 2, for example.

FIG. 2 is a block diagram illustrating an example of hardware configuration of a computer 500, according to the present embodiment. As illustrated in FIG. 2, the computer 500 includes a central processing unit (CPU) 501, a read only memory (ROM) 502, a random access memory (RAM) 503, a hard disc (HD) 504, a hard disc drive (HDD) controller 505, a display 506, an external device connection interface (I/F) 508, a network I/F 509, a data bus 510, a keyboard 511, a pointing device 512, a digital versatile disc-rewritable (DVD-RW) drive 514, and a medium I/F 516.

Among these elements, the CPU 501 controls entire operation of the computer 500. The ROM 502 stores a control program such as an initial program loader (IPL) to boot the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using the network 16. The data bus 510 is an address bus, a data bus, or the like for electrically connecting each element such as the CPU 501.

The keyboard 511 is an example of input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 3:
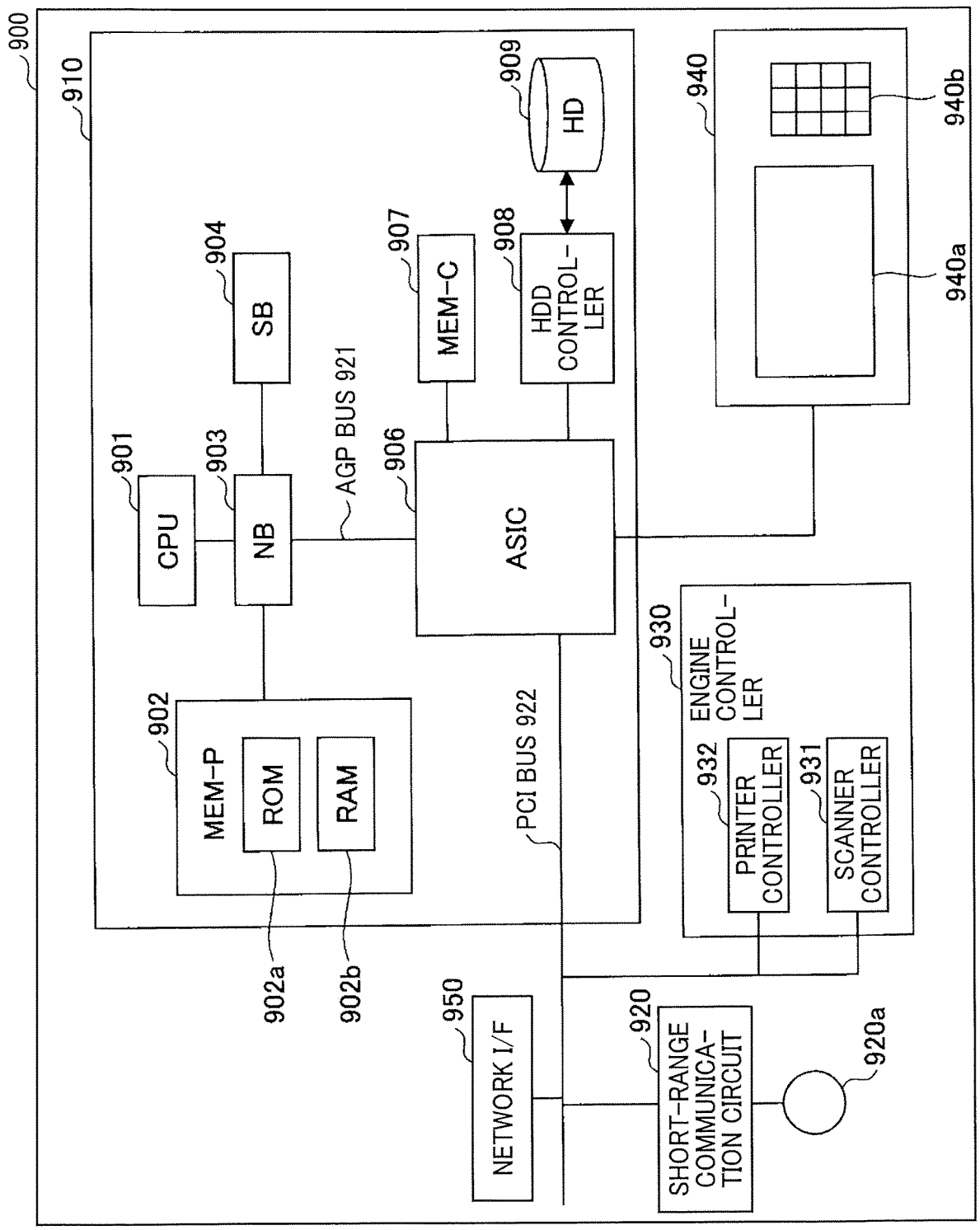
FIG. 3 is a block diagram illustrating an example of a hardware configuration of a multifunctional peripheral (MFP) according to embodiments of the present disclosure.

When the client 10 included in the information processing system 1 is the MFP which is an example of the device, the hardware configuration is as illustrated in FIG. 3, for example. FIG. 3 is a block diagram illustrating an example of a hardware configuration of an MFP 900 according to the present embodiment. As illustrated in FIG. 3, the MFP 900 includes a controller 910, a short-range communication circuit 920, an engine controller 930, an operation panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

Among these elements, the CPU 901 is a control unit that performs overall control of the MFP 900. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner controller 931 and a printer controller 932 through the PCI bus 922. The ASIC 906 may be connected to a USB interface, or the Institute of Electrical and Electronics Engineers 1394 (IEEE 1394) interface.

The MEM-C 907 is a local memory used as a buffer for image data to be copied or code image. The HD 909 is a storage for storing image data, font data used during printing, and forms. The HDD controller 908 reads or writes various data from or to the HD 909 under control of the CPU

901. The AGP bus 921 is a bus interface for a graphics accelerator card, which has been proposed to accelerate graphics processing. Through directly accessing the MEM-P 902 by high-throughput, the graphics accelerator card is accelerated.

The short-range communication circuit 920 is provided with a short-range communication antenna 920a. The short-range communication circuit 920 is a communication circuit that communicates in compliance with the near field communication (NFC), the Bluetooth (registered trademark) and the like.

Further, the engine controller 930 includes a scanner controller 931 and a printer controller 932. The operation panel 940 displays a current setting value, a selection screen, a start key that accepts a copy start instruction, and the like, a panel display unit 940a such as a touch panel that accepts an input from the operator, a density setting condition, and the like, and an operation panel 940b including a numeric keypad for accepting setting values of conditions relating to image formation such as density settings is provided. The controller 910 controls entire operation of the MFP 900. For example, the controller 910 controls drawing, communication, or user inputs to the operation panel 940. The scanner controller 931 and the printer controller 932 each performs various image processing, such as error diffusion or gamma conversion.

In response to an instruction to select a specific application through the operation panel 940, for example, using a mode switch key, the MFP 900 selectively performs a document box function, a copy function, a print function, and a facsimile function. When the document box function is selected, the MFP 900 operates in a document box mode to store document data. With selection of the copy function, the MFP 900 operates in a copy mode. With selection of the print function, the MFP 900 operates in a print mode. With selection of the facsimile function, the MFP 900 operates in a facsimile mode.

The network I/F 950 is an interface for performing data communication using the network 16. The short-range communication circuit 920 and the network I/F 950 are electrically connected to the ASIC 906 through the PCI bus 922.

Figures 4, 4A:
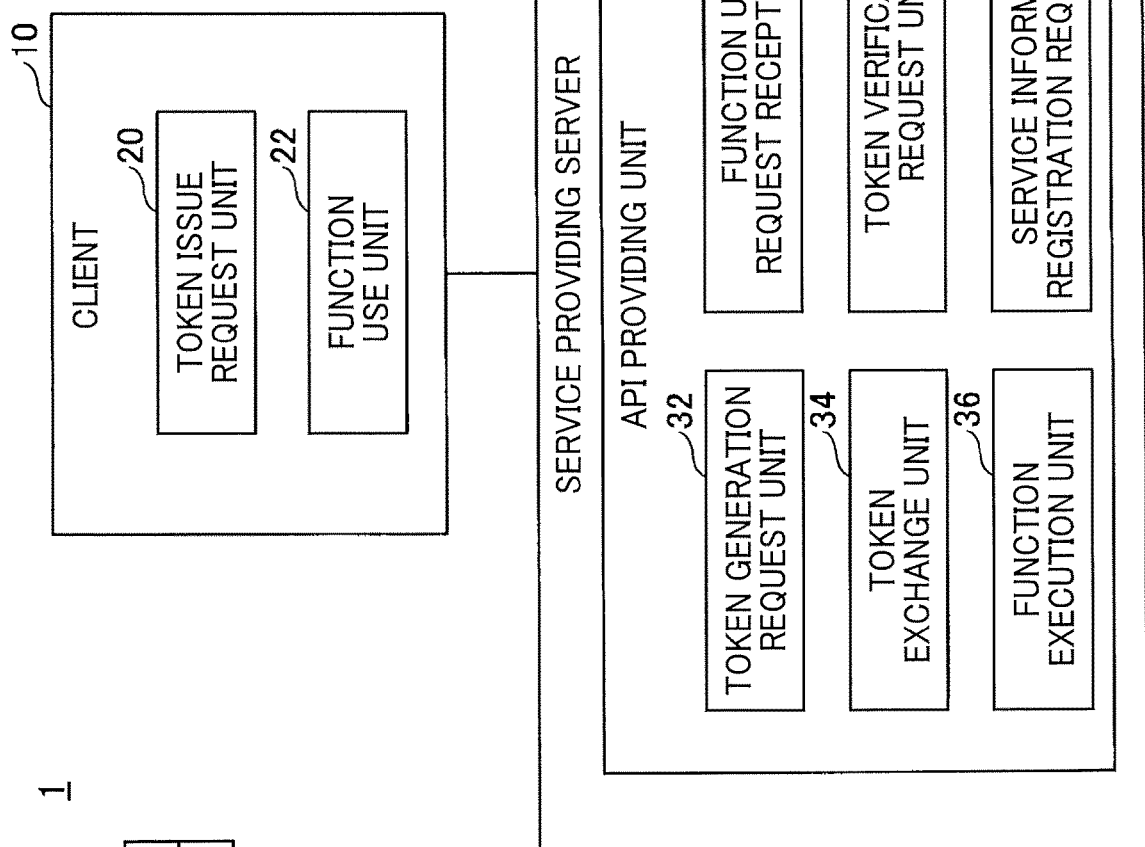
FIG. 4A and FIG. 4B are block diagrams illustrating an example of a functional configuration of the information processing system according to embodiments of the present disclosure.
Figure 4B:
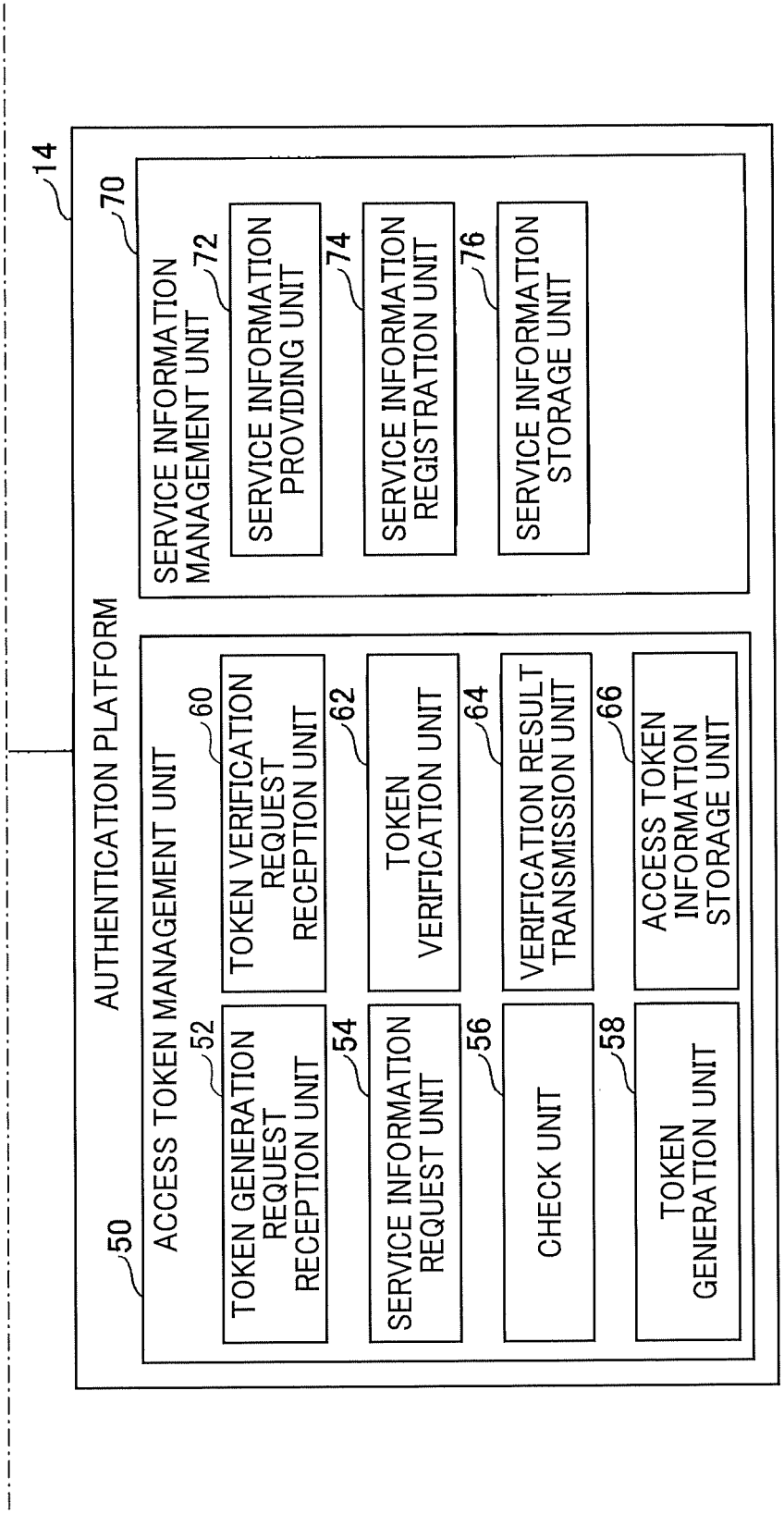

FIG. 4A and FIG. 4B are block diagrams illustrating an example of a functional configuration of the information processing system according to the present embodiment. The client 10 included in the information processing system 1 in FIG. 4A includes a token issue request unit 20 and a function use unit 22. These components are implemented by a process that one or more programs installed in the client 10 cause the CPU 501 and the like to execute.

The token issue request unit 20 makes a token issue request to the service providing server 12 that uses the API, thereby acquiring an access token necessary for using the API provided by the service providing server 12. The function use unit 22 designates the access token and transmits a function use request to the service providing server 12 to use the function provided by the service providing server 12 through the API.

Further, the service providing server 12 included in the information processing system 1 in FIG. 4A has an API providing unit 30. The API providing unit 30 includes a token generation request unit 32, a token exchange unit 34, a function execution unit 36, a function use request reception unit 38, a token verification request unit 40, and a service information registration request unit 42. Each of these functional blocks is implemented by a process that one or more programs installed in the client 10 cause the CPU 501 and the like to execute.

The API providing unit 30 provides an API as a service to the client 10. In response to receiving a token issue request from the client 10, the token generation request unit 32 designates a service identifier (ID) and transmits a token generation request to the authentication platform 14. The token exchange unit 34 transmits the access token received from the authentication platform 14 to the client 10.

The function use request reception unit 38 receives a function use request designating an access token from the client 10. The token verification request unit 40 designates a service ID, a function name, etc., transmits an access token verification request to the authentication platform 14, and receives an access token verification result from the authentication platform 14.

In response to receiving a valid verification result of the access token, the function execution unit 36 executes the function requested by the client 10 and transmits the execution result. The service information registration request unit 42 transmits a service information registration request to the authentication platform 14 in advance. Details of the service information are described below.

Further, the authentication platform 14 included in the information processing system 1 illustrated in FIG. 4B includes an access token management unit 50 and a service information management unit 70. The access token management unit 50 includes a token generation request reception unit 52, a service information request unit 54, a check unit 56, a token generation unit 58, a token verification request reception unit 60, a token verification unit 62, and a verification result transmission unit 64 and an access token information storage unit 66. The service information management unit 70 includes a service information providing unit 72, a service information registration unit 74, and a service information storage unit 76.

The access token management unit 50 performs access token management processing such as generation of an access token that proves that the user has been authorized, management of access token information of the generated access token, and verification of the access token. The service information management unit 70 performs the service information management process that manages association between service provided by the service providing server 12 and function provided by the service as service information.

The token generation request reception unit 52 receives a token generation request designating a service ID and a scope from the service providing server 12. The service information request unit 54 designates a service ID, makes a service information acquisition request to the service information management unit 70, and acquires service information corresponding to the service ID. The check unit 56 refers to the acquired service information and checks whether the association between the service ID and the scope indicated in the token generation request is correct (whether the association is valid).

If the association between the service ID and the scope in the token generation request is valid, the token generation unit 58 generates an access token and transmits the access token to the service providing server 12. The token verification request reception unit 60 receives an access token verification request designating the service ID.

The token verification unit 62 refers to the service information acquired by the service information request unit 54 and the access token information of the access token for which the verification request has been made and verifies whether the association between the service ID and scope designated in the access token verification request is correct (whether the association is valid) as described below. The verification result transmission unit 64 transmits the access token verification result to the service providing server 12. The access token information storage unit 66 stores access token information.

The service information providing unit 72 receives a service information acquisition request designating a service ID from the access token management unit 50, reads service information corresponding to the service ID from the service information storage unit 76, and transmits the service information to the access token management unit 50. The service information registration unit 74 receives a service information registration request from the service providing server 12 and registers the service information in the service information storage unit 76. The service information storage unit 76 stores service information.

FIG. 5 is a configuration diagram of an example of service information. The service information in FIG. 5 is registered in advance from the service providing server 12 and stores combinations of service IDs and scopes. The service information illustrated in FIG. 5 includes the service ID, a service name, the scope, and a function name as items.

The service ID is an example of service identification information. The service name is the name of the service. The scope is a functional unit provided by the API, and the granularity to be defined can be determined for each service. For example, a scope for reading, writing, and deleting user information can be defined for a user management service that is an example of a service. The function name is a name of the function unit indicated by the scope.

FIG. 6 is a configuration diagram of an example of access token information. The access token information stores a combination of the access token, a user who issued the access token, the scope used by the access token, and the service ID of the service used by the access token.

The access token information in FIG. 6 includes an ID, the access token, the user ID, the scope, and the service ID as items. The ID is an example of identification information of access token information. The access token is information on the access token issued to the user, for example, information represented by a combination of unique and random alphanumeric characters. The user ID is an example of identification information of the user who issued the access token. The scope is information indicating the function that can be used by the user with the access token. The service ID is information identifying the service that can be used by the user with the access token.

Figure 7:
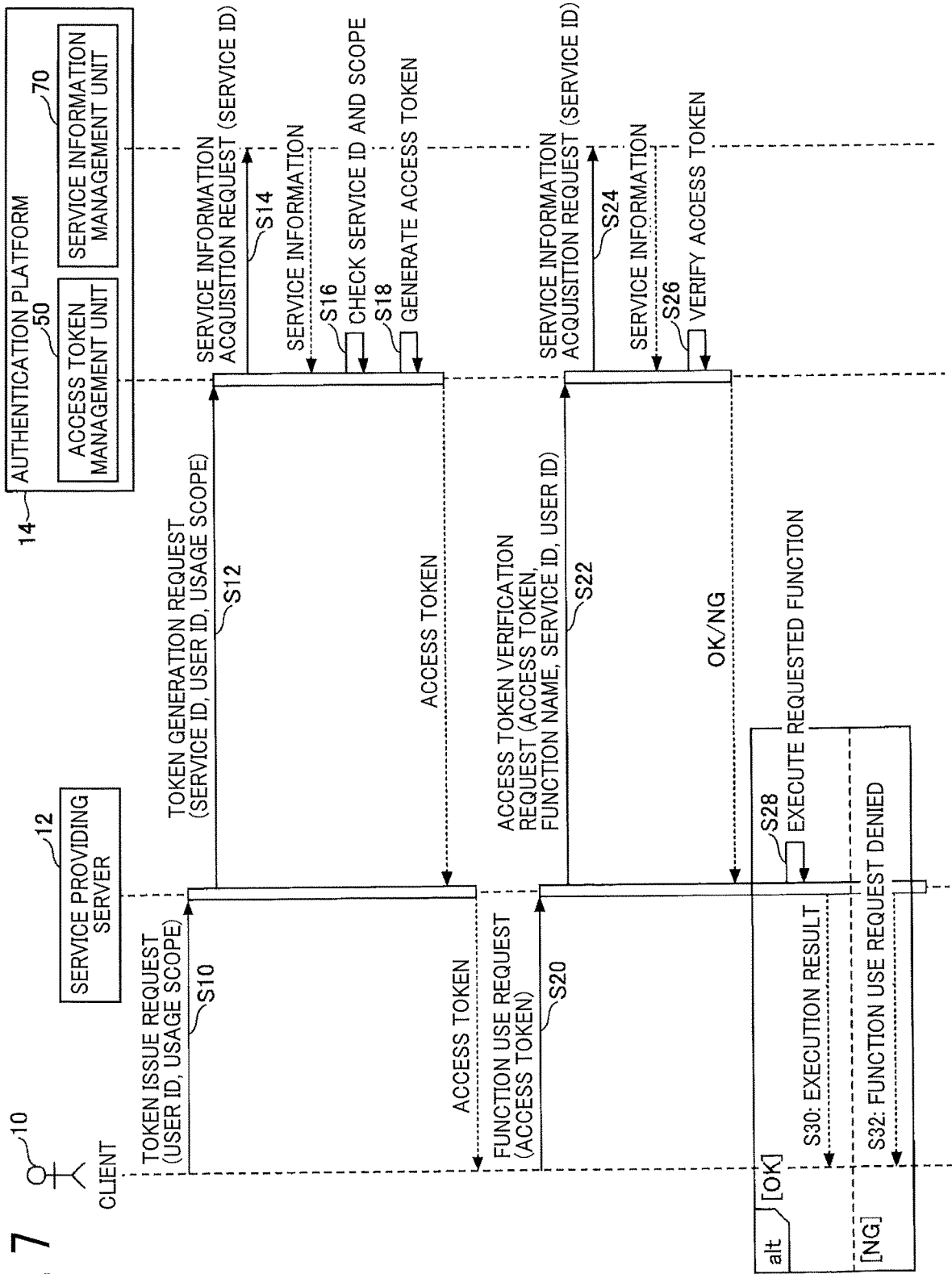
FIG. 7 is a sequence diagram illustrating an example of processing executed by the information processing system according to embodiments of the present disclosure.

A description is given below of processes executed by the information processing system 1 according to the present embodiment. FIG. 7 is a sequence diagram illustrating an example of processing executed by the information processing system 1 according to the present embodiment.

In step S10, the client 10 operated by the user makes a token issue request to the service providing server 12 that uses the API, which includes the user ID and the usage scope. The usage scope designated in step S10 defines the scope to be used by the access token.

In step S12, in response to receiving the token issue request from the client 10, the service providing server 12 generates a token generation request that includes the service ID of the service providing server 12 in addition to the user ID and usage scope included in the token issue request received in step S10 and transmits the token generation request to the authentication platform 14.

The access token management unit 50 of the authentication platform 14 receives the token generation request designating the service ID, user ID, and usage scope from the service providing server 12 and proceeds to step S14. In step S14, the access token management unit 50 transmits a service information acquisition request to the service information management unit 70, which includes the service ID designated in the token generation request.

The service information management unit 70 receives the service information acquisition request designating the service ID from the access token management unit 50, reads service information corresponding to the service ID from the service information storage unit 76, and transmits the service information to the access token management unit 50. Accordingly, the access token management unit 50 acquires the service information corresponding to the service ID included in the token generation request.

In step S16, the access token management unit 50 refers to the acquired service information illustrated in FIG. 5, for example, and checks whether the association between the service ID and the usage scope indicated in the token generation request is correct (valid).

When the association between the service ID and the usage scope indicated in the token generation request matches the definition of the service information in FIG. 5, the access token management unit 50 determines that the association between the service ID and the usage scope is correct (valid). In contrary, when the association between the service ID and the usage scope indicated in the token generation request does not match the definition of the service information in FIG. 5, the access token management unit 50 determines that the association between the service ID and the usage scope is not correct (invalid).

In step S18, the access token management unit 50 generates an access token and transmits the access token to the service providing server 12 when the association between the service ID and the usage scope indicated in the token generation request is valid. The service providing server 12 transmits the access token received from the authentication platform 14 to the client 10.

In step S20, the client 10 that has received the access token transmits a function use request to the service providing server 12, which designates the access token to the service providing server 12 that uses the API.

The service providing server 12 that has received the function use request from the client 10 proceeds to step S22. In step S22, the service providing server 12 transmits an access token verification request to the authentication platform 14, including the service ID of the service providing server 12, the function name, and the user ID of the user who operates the client 10 in the access token designated in the function use request received in step S20.

The access token management unit 50 of the authentication platform 14 that has received the access token verification request designating the service ID, the function name, the user ID, and the access token proceeds to step S24. In step S24, the access token management unit 50 transmits a service information acquisition request to the service information management unit 70, which designates the service ID obtained from the access token verification request.

The service information management unit 70 receives a service information acquisition request designating a service ID from the access token management unit 50, reads service information corresponding to the service ID from the service information storage unit 76, and transmits the service information to the access token management unit 50. Accordingly, the access token management unit 50 acquires service information corresponding to the service ID designated in the access token verification request.

In step S26, the access token management unit 50 verifies the access token requested to be verified. The verification of the access token performed in step S26 includes not only verification of validity of the access token, matching of the user ID, matching of the usage scope, and the like, but also includes validity of the association between the usage scope and the service ID and matching of the service ID.

In the verification of the validity of the association between the usage scope and the service ID performed in step S26, whether the association between the service ID and the function name indicated in the access token verification request matches the definition of the service information in FIG. 5 is verified.

Further, in the verification of the service ID performed in step S26, referring to the access token information of the access token that was requested for verification, whether the service ID indicated in the access token verification request and the service ID stored in the access token information are the same (correct) is verified.

The access token management unit 50 transmits the access token verification result to the service providing server 12. When the verification result of the access token is valid, the service providing server 12 executes the function requested by the client 10 in step S28. The service providing server 12 transmits the execution result to the client 10 in step S30.

When the verification result of the access token is not valid, the service providing server 12 transmits information indicating that the function requested by the client 10 cannot be executed to the client 10 in step S32.

Figure 8:
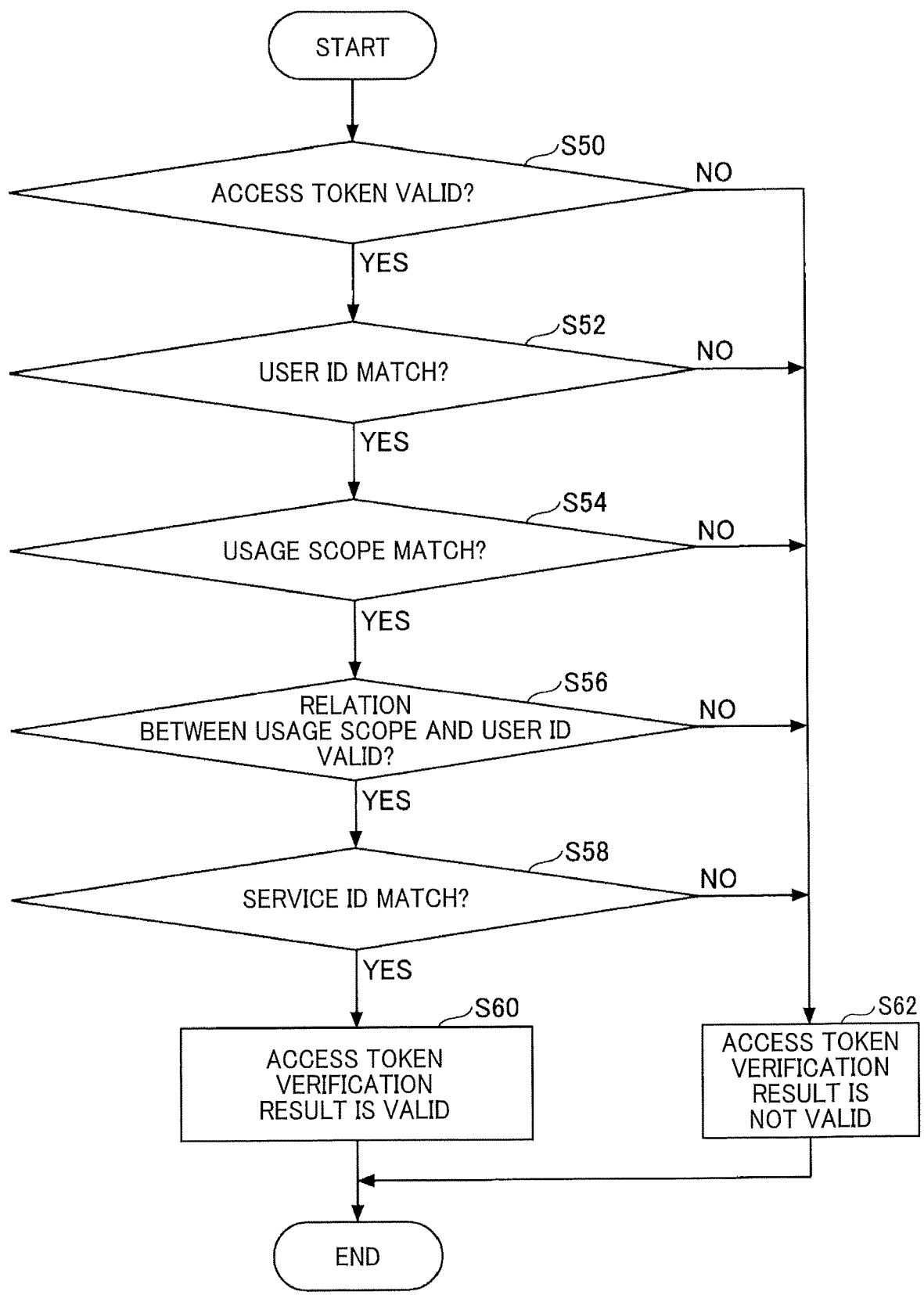
FIG. 8 is a flowchart illustrating an example of an access token verification process.

The access token verification in step S26 is performed, for example, according to the process illustrated in the flowchart of FIG. 8. FIG. 8 is a flowchart illustrating an example of an access token verification process.

In step S50, the access token management unit 50 determines whether the access token requested for verification from the service providing server 12 is valid. Note that the validity of the access token in step S50 is determined based on whether or not the access token requested for verification from the service providing server 12 is stored in the access token information table in FIG. 6. If the access token requested for verification from the service providing server 12 is stored in the access token information table illustrated in FIG. 6, the access token management unit 50 determines that the access token is valid. The access token management unit 50 proceeds to step S52 if the access token is valid and proceeds to step S62 if the access token is not valid.

In step S52, the access token management unit 50 determines whether the user ID (user ID of the user who operates the client 10) indicated in the access token verification request matches the user ID included in the access token information of the access token for which the verification request has been made. If there is a match between user IDs, the access token management unit 50 proceeds to step S54, and if there is no match between user IDs, the process proceeds to step S62.

In step S54, the access token management unit 50 determines whether the scope indicated by the function name indicated in the access token verification request matches with the scope included in the access token information of the access token for which the verification request has been made. If there is a match in the usage scope, the access token management unit 50 proceeds to step S56, and if there is no match in the usage scope, the process proceeds to step S62.

In step S56, the access token management unit 50 determines whether or not the association between the usage scope and the service ID of the access token requested by the service providing server 12 is valid. Note that the validity of the association between the usage scope and the service ID in step S56 is determined based on whether the association between the service ID and the function name indicated in the access token verification request matches the definition of the service information illustrated in FIG. 5.

The access token management unit 50 determines that the association between the service ID and the function name indicated in the access token verification request is valid, when the association between the service ID and the scope indicated by the function name included in the access token verification request is defined in the service information in FIG. 5. If the association between the service ID and the function name indicated in the access token verification request is valid, the access token management unit 50 proceeds to step S58, and if not, proceeds to step S62.

In step S58, the access token management unit 50 determines whether the service ID included in the verification request from the service providing server 12 matches with the service ID (service ID of the access token information in FIG. 6) indicated by the access token for which the verification request has been made. If there is a match in the service IDs, the access token management unit 50 proceeds to step S60, and if there is no match in the service IDs, the process proceeds to step S62.

In step S60, the access token management unit 50 determines that the access token verification result is valid. The access token management unit 50 determines that the verification result of the access token is valid when all of the validity of the access token, the matching of the user ID, the matching of the usage scope, the validity of the association between the usage scope and the service ID, and the matching of the service ID are confirmed.

On the other hand, in step S62, the access token management unit 50 determines that the access token verification result is not valid. The access token management unit 50 determines that the verification result of the access token is not valid when any of the validity of the access token, the matching of the user ID, the matching of the usage scope, the validity of the association between the usage scope and the service ID, and the matching of the service ID is not confirmed.

In the present embodiment, the service ID is issued to the service provided by the service providing server 12 and the association between the service ID and the scope is managed. When the access token is generated and verified, the service providing server 12 can verify the validity of the association between the usage scope and the service ID and the matching of the service ID by designating the service ID additionally.

As described above, according to the present embodiment, when the access token is generated and verified in the authentication platform 14, a mechanism for verifying (determining) the validity of the association between the service of the service providing server 12 and the scope indicated by the access token can be implemented. In addition, according to the present embodiment, various services can provide functions through the API using a single authentication platform 14.

Note that in the access token verification process in step S26, an access token that can be used from one service to another service can be issued unless the validity of the association between the usage scope and the service ID and the matching of the service ID are verified. For example, a service that utilizes IWB can give a user the authority to use the workflow application of the MFP. In the present embodiment, it is possible to prevent issuance of an access token that can be used by another service from one service by verifying the validity of the association between the usage scope and the service ID and the matching of the service ID.

In the information processing system 1 according to the second embodiment, the configuration of the service providing server 12 is substantially the same from the information processing system 1 according to the first embodiment, except for some differences, and thus description thereof is omitted as appropriate for substantially the same parts.

Figure 9A:
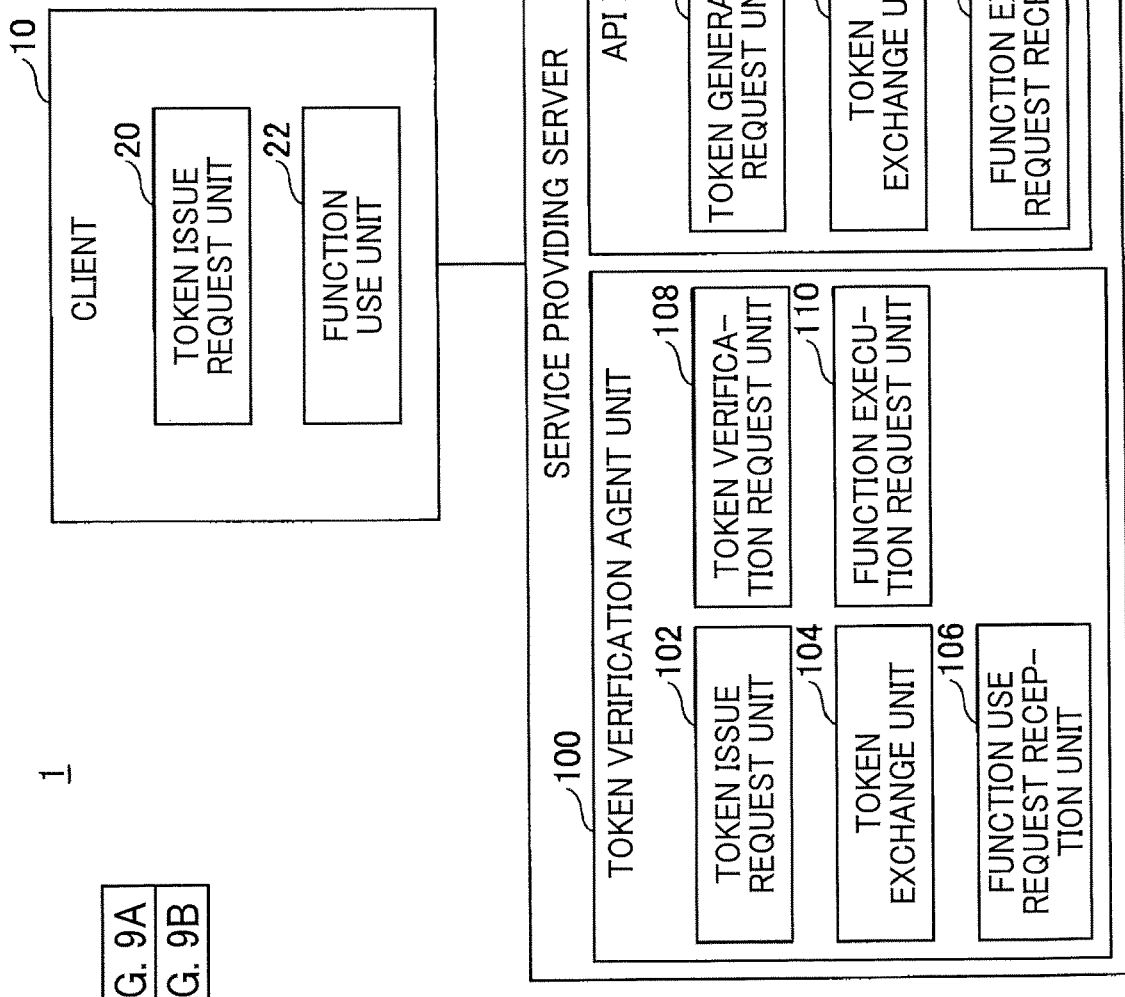
FIG. 9A and FIG. 9B are block diagrams illustrating an example of a functional configuration of the information processing system according to embodiments of the present disclosure.
Figure 9B:
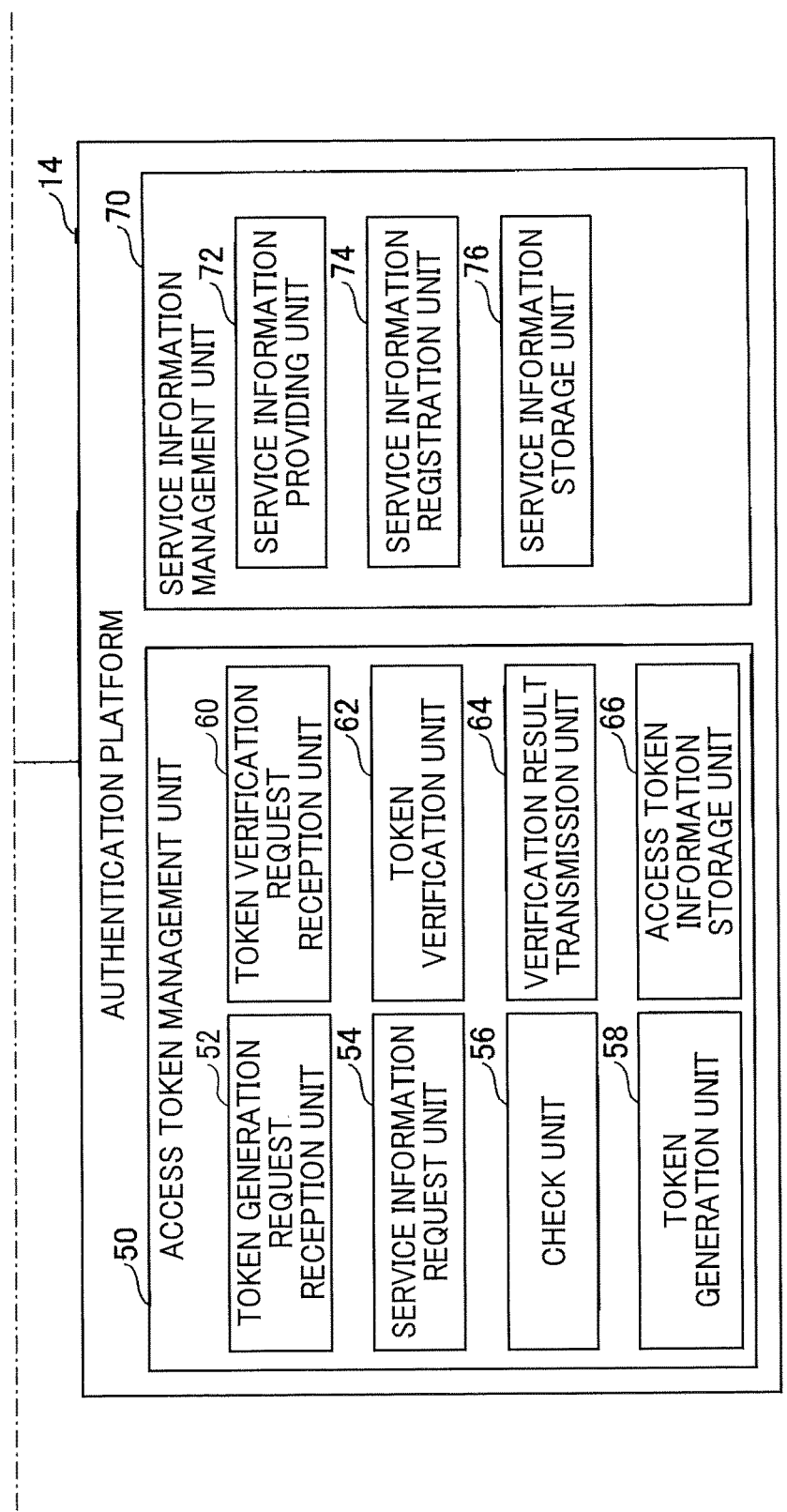

FIG. 9A and FIG. 9B are block diagrams illustrating an example of a functional configuration of the information processing system according to the present embodiment. The difference between the functional configuration of the information processing system 1 in FIGS. 9A and 9B, and the functional configuration of the information processing system 1 in FIGS. 4A and 4B is the functional configuration of the service providing server 12. The service providing server 12 included in the information processing system 1 in FIGS. 9A and 9B includes an API providing unit 30 and a token verification agent unit 100.

The API providing unit 30 includes a token generation request unit 32, a token exchange unit 34, a function execution unit 36, a service information registration request unit 42, and a function execution request reception unit 44. Each of these functional blocks is implemented by a process that one or more programs installed in the client 10 cause the CPU 501 and the like to execute.

The token generation request unit 32, token exchange unit 34, function execution unit 36, and service information registration request unit 42 are the same as the units included in the API providing unit 30 illustrated in FIG. 4A. The function execution request reception unit 44 receives a function execution request from the token verification agent unit 100.

The token verification agent unit 100 includes a token issue request unit 102, a token exchange unit 104, a function use request reception unit 106, a token verification request unit 108, and a function execution request unit 110. Each of these functional blocks is implemented by a process that one or more programs installed in the client 10 cause the CPU 501 and the like to execute.

The token issue request unit 102 transmits the token issue request received from the client 10 to the API providing unit 30. The token exchange unit 104 transmits the access token received from the API providing unit 30 to the client 10. The function use request reception unit 106 receives a function use request indicating an access token and a function name from the client 10.

The token verification request unit 108 designates a service ID, a function name, etc., transmits an access token verification request to the authentication platform 14, and receives an access token verification result from the authentication platform 14. The function execution request unit 110 transmits a function execution request to the API providing unit 30 by designating a function name.

Figure 10:
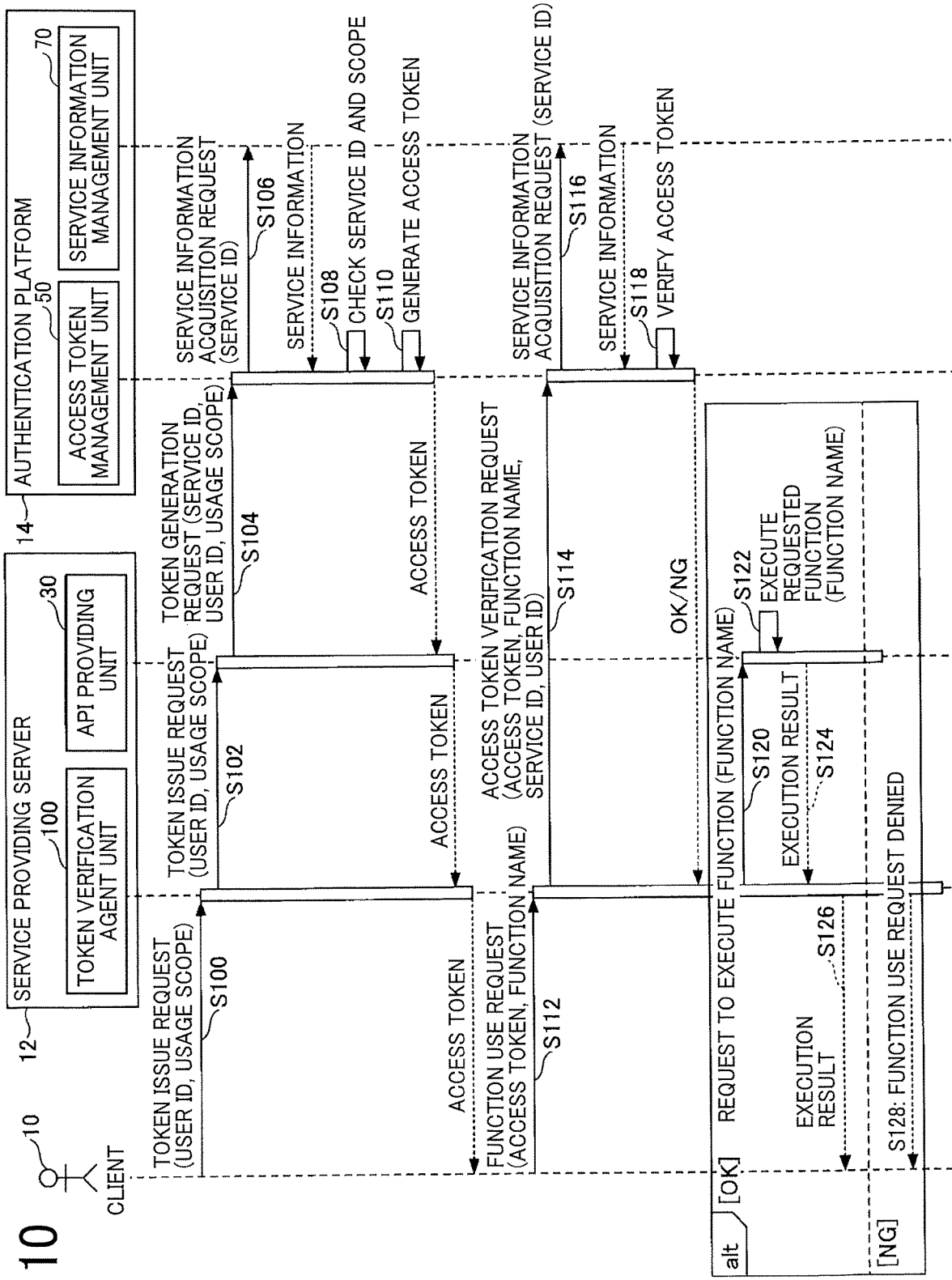
FIG. 10 is a sequence diagram illustrating an example of processing executed by the information processing system according to embodiments of the present disclosure.

A description is given below of processes executed by the information processing system 1 according to the second embodiment. FIG. 10 is a sequence diagram illustrating an example of processing of the information processing system 1 according to the present embodiment. Since a part of the sequence diagrams of FIG. 10 is the same as the sequence diagram of FIG. 7, the redundant description thereof is omitted below.

In step S100, the client 10 operated by the user transmits a token issue request to the service providing server 12 that uses the API, designating the user ID and the usage scope. The usage scope designated in step S100 indicates the scope to be used by the access token.

In step S102, the token verification agent unit 100 of the service providing server 12 transmits a token issue request received from the client 10 to the API providing unit 30. In response to receiving the token issue request from the client 10, the API providing unit 30 adds the service ID of the service providing server 12 to the user ID and usage scope included in the token issue request in step S102 and transmits a token generation request to the authentication platform 14 in step S104.

Since the processing in steps S106 through S110 is the same as the processing in steps S14 through S18 in FIG. 7, description thereof is omitted. The service providing server 12 transmits the access token received from the authentication platform 14 to the client 10.

In step S112, the client 10 that has received the access token transmits a function use request to the service providing server 12 that uses the API designating the access token and the function name.

The token verification agent unit 100 of the service providing server 12 that has received the function use request from the client 10 proceeds to step S114. The token verification agent unit 100 includes the service ID of the service providing server 12 and the user ID of the user who operates the client 10 in the access token included in the function use request received in step S112 and transmits an access token verification request to the authentication platform 14.

Since the processing in steps S116 through S118 is the same as the processing in steps S24 through S26 in FIG. 7, description thereof is omitted. The token verification agent unit 100 of the service providing server 12 that has received the access token verification result proceeds to step S120 if the access token verification result is valid, and requests the API providing unit 30 to execute the function requested from the client 10. In step S122, the API providing unit 30 executes the function requested by the client 10.

In step S124, the API providing unit 30 transmits the execution result to the token verification agent unit 100. In step S126, the token verification agent unit 100 transmits the execution result to the client 10.

If the verification result of the access token is not valid, the token verification agent unit 100 transmits information indicating that the function requested by the client 10 cannot be executed to the client 10 in step S128.

In the information processing system 1 according to the second embodiment, a processed by the token verification agent unit 100 is performed before a processed by the API providing unit 30 of each service providing server 12, and when the function is to be used, the access token is verified not by the API providing unit 30 but by the common token verification agent unit 100. Accordingly, the API providing unit 30 of the information processing system 1 according to the second embodiment does not need to perform processing related to access token verification and can concentrate on executing functions.

In addition, the API providing unit 30 of the information processing system 1 according to the second embodiment can be easily implemented by performing access token verification at the time of function use not by the API providing unit 30 but by the common token verification agent unit 100.

Figure 11:
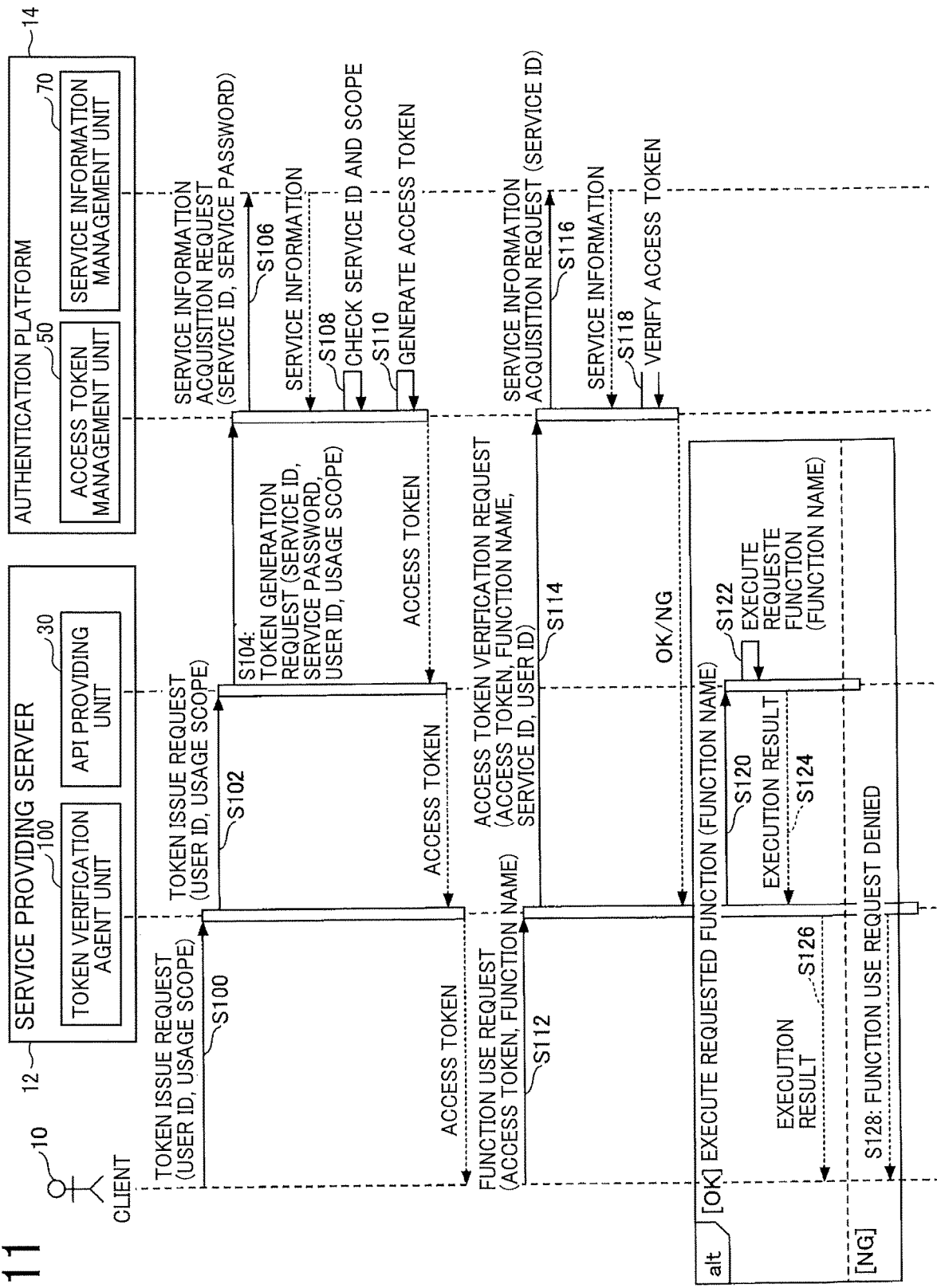
FIG. 11 is a sequence diagram illustrating an example of processing executed by the information processing system according to embodiments of the present disclosure.

By adding a service password in the processing of steps S104 and S106 as in the sequence diagram illustrated in FIG. 11, security can be improved in the processing of the sequence diagram illustrated in FIG. 10. Since the service is verified at the time of issuing the access token, the protection by the service password is unnecessary in the verification of the access token when using the function.

In the case of protection with the service password, the token verification agent unit 100 needs to be able to access the authentication platform 14 with privileges. Since the token verification agent unit 100 is distributed in common to the service providing server 12, there is no problem in giving privileges. The service password includes, for example, any character string (any character string such as 12345 and abcde). Since other processes are the same as the processes in the sequence diagram illustrated in FIG. 10, description thereof is omitted.

Further, in the information processing system 1 according to the present embodiment, there may be a case where it is more efficient to request a similar service scope at the same time, for example, a projector projection service and an IWB display service. For example, when service A and service C are closely-related services, the relation between the close services is defined as illustrated in FIG. 12.

FIG. 12 is a configuration diagram of an example of relation definition information that defines a relation between services. According to the relation definition information "RELATION 1" in FIG. 12, for example, when the service A requests the issuance of an access token, the issuance of the access token can be permitted even if the scope of the service C is requested. As described above, allowing the use of a service that is not allowed originally through other services designated in the relation definition information in FIG. 12, user operability can be improved.

Furthermore, a time period for retaining the service information registered by the service providing server 12 in advance illustrated in FIG. 5 may be set, for example, by setting a certain expiration date. By deleting service information that has expired, the service information is kept updated while removing old information. By setting the time period for retaining the service information in this manner, it is possible to keep the service information in FIG. 5 updated and facilitate management.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The access token is an example of authorization information described in the claims. An API is an example of a service to be provided. A scope is an example of a usage function. The service password is an example of service secret information.

What is claimed is:

1. An information processing system comprising:
   an authentication platform implemented by one or more information processing apparatuses; and
   a service providing server configured to provide one or more usage functions as a service to a client, wherein the authentication platform includes circuitry configured to:
   store association information indicating association between service identification information for identifying the service and the one or more usage functions provided as the service;
   generate an authorization information in response to a result of a verification of association between the service identification information and the one or more usage functions included in an authorization information generation request being valid;
   transmit the authorization information to the service providing server from which the authorization information generation request is received;
   receive a verification request including the service identification information, the one or more usage functions, and the authorization information from the service providing server;
   verify validity of association between the service identification information and the one or more usage functions included in the verification request based on the stored association information to verify validity of the authorization information; and
   send a result of verifying the validity of the association between the service identification information and the one or more usage functions included in the verification request to the service providing server from which the verification request is received.

2. The information processing system of claim 1, wherein when the authorization information generation request including the service identification information and the one or more usage functions is received, the circuitry is further configured to:
   verify validity of association between the service identification information and the one or more usage functions included in the authorization information generation request based on the stored association information.

3. The information processing system of claim 1, wherein when a second authorization information generation request including the service identification information, service secret information, and the one or more usage functions is received, the circuitry is further configured to:
   verify validity of association between the service identification information, the service secret information, and the one or more usage functions included in the second authorization information generation request based on the stored association information;
   generate a second authorization information when a result of verification of association between the service identification information, the service secret information, and the one or more usage functions included in the second authorization information generation request is valid; and
   transmit the second authorization information to the service providing server from which the second authorization information generation request is received.

4. The information processing system of claim 3, wherein the circuitry is further configured to:
   define a relation between a first service and a second service in relation definition information;
   generate authorization information for the second service defined to have the relation with the first service when the first service has been verified as valid; and transmit the authorization information generated for the second service to the second service.

5. The information processing system of claim 1, wherein the service providing server includes circuitry configured to:
send the verification request including the service identification information, the one or more usage functions, and the authorization information to the authentication platform;
receive the result of verifying the validity of the association between the service identification information and the one or more usage functions included in the verification request, from the authentication platform; and
provide the one or more usage functions included in the verification request to a client based on a function execution request from the authentication platform that has verified the validity of the association between the service identification information and the one or more usage functions included in the verification request.

6. The information processing system of claim 1, wherein the circuitry sets a time period for retaining the stored association information.

7. An authentication platform, implemented by one or more information processing apparatuses, the authentication platform comprising circuitry configured to store, in a memory, association information indicating association between one or more usage functions provided by a service providing server to a client as a service and service identification information of the service;
generate an authorization information in response to a result of a verification of association between the service identification information and the one or more usage functions included in an authorization information generation request being valid;
transmit the authorization information to the service providing server from which the authorization information generation request is received;
receive a verification request including the service identification information, the one or more usage functions, and the authorization information from the service providing server;
verify validity of association between the service identification information and the one or more usage functions included in the verification request based on the stored association information to verify validity of the authorization information; and
send a result of verifying the validity of the association between the service identification information and the one or more usage functions included in the verification request to the service providing server from which the verification request is received.

8. A method performed by an authentication platform, the method comprising:
storing, in a memory, association information indicating association between one or more usage functions provided by a service providing server to a client as a service and service identification information of the service;
generating an authorization information in response to a result of a verification of association between the service identification information and the one or more usage functions included in an authorization information generation request being valid;
transmitting the authorization information to the service providing server from which the authorization information generation request is received;
receiving a verification request including the service identification information, the one or more usage functions, and the authorization information from the service providing server;
verifying validity of association between the service identification information and the one or more usage functions included in the verification request based on the stored association information to verify validity of the authorization information; and
sending a result of verifying the validity of the association between the service identification information and the one or more usage functions included in the verification request to the service providing server from which the verification request is received.

* * * * *